UNITED STATES PATENT OFFICE.

HIRAM G. HICKS, OF WORCESTER, MASSACHUSETTS.

WELDING COMPOUND.

SPECIFICATION forming part of Letters Patent No. 355,395, dated January 4, 1887.

Application filed October 4, 1886. Serial No. 215,287. (No specimens.)

*To all whom it may concern:*

Be it known that I, HIRAM G. HICKS, a citizen of the United States, residing at Worcester, in the county of Worcester and State of Massachusetts, have invented a certain new and useful Compound for Welding, Toughening, and Refining Steel, of which the following is a specification sufficiently full, clear, and exact to enable persons skilled in the art to which this invention appertains to make and use the same.

The object of my present invention is to provide a practical and efficient compound, adapted for the convenient use of blacksmiths and other metal-workers, for the purposes of welding, toughening, and refining steel, and for correcting and restoring to proper condition the quality and life of steel which has been burned or overheated; also, to provide a compound or composition of matter for the purposes stated which will not deteriorate and become practically useless by standing for a considerable time or under the ordinary conditions of exposure. These objects I attain by a composition formed of ingredients combined as hereinafter described and claimed.

For producing my improved welding compound I employ the following-named substances as ingredients, which I prefer to combine in the proportions specified, although some variation of proportion may be permitted without materially changing the nature thereof—viz: borax, one pound; sal-ammoniac, one ounce, (more or less;) carbonate of iron, one-half ounce; black oxide of manganese, one-half ounce.

In making the compound the borax is first heated in an open pan or vessel over a slow fire to drive off a considerable portion of the water of crystallization, the sal-ammoniac (otherwise known as "hydrochloriate," "muriate," or "chloride" of ammonia) is added, together with the iron carbonate and manganese oxide, and the mass is mixed together and gently heated until properly dry. It is then cooled and comminuted, or pulverized by grinding to a fine-powdered form, in which condition it is put up in packages ready for market and use.

When used, the powdered compound is sprinkled upon the surface of the steel to be welded or forged, the metal having been previously heated to a red heat in a manner similar to the processes heretofore employed.

Among the advantages of my improved compound it may be mentioned that it makes a weld that is solid or as good as the unwelded part of the bar, while the steel can be worked and successfully welded at comparatively very low temperature or at a heat slightly above "cherry-red." It also preserves, toughens, and refines the metal with which it is brought into contact, while it requires but about one fourth the usual quantity of the compound to effect the desired result, and in a much more efficient manner as compared with the ordinarily-employed welding-fluxes heretofore in use.

My compound is also very useful for the purpose of welding cast-steel, and also for correcting or restoring to proper condition steel that has been overheated or burned and for giving renewed life and quality to drills, stone-dressing tools, and similar tools that have been injured in heating and tempering.

This composition, prepared as described, can be kept for a long time without injury or material deterioration from exposure under ordinary conditions of storage.

What I claim as of my invention, and desire to secure by Letters Patent, is—

1. A compound for the purposes of welding, toughening, and refining steel, consisting of borax, sal-ammoniac, carbonate of iron, and black oxide of manganese, in combination, substantially as hereinbefore set forth.

2. A compound for use in welding, refining, or treating steel, composed of borax, sal-ammoniac, carbonate of iron, and black oxide of manganese, combined in the proportions substantially as specified, and prepared in the manner substantially as described.

Witness my hand this 2d day of October, A. D. 1886.

HIRAM G. HICKS.

Witnesses:
CHAS. H. BURLEIGH,
ELLA P. BLENUS.